(12) United States Patent
Li et al.

(10) Patent No.: US 11,104,333 B2
(45) Date of Patent: Aug. 31, 2021

(54) EMERGENCY BRAKING SYSTEM, EMERGENCY BRAKING METHOD AND SEMITRAILER

(71) Applicant: TUSIMPLE, INC., San Diego, CA (US)

(72) Inventors: Junfeng Li, Beijing (CN); Nan Wu, Beijing (CN)

(73) Assignee: TUSIMPLE, INC., San Diego, CA (US)

(*) Notice: Subject to any disclaimer, the term of this patent is extended or adjusted under 35 U.S.C. 154(b) by 216 days.

(21) Appl. No.: 16/357,726

(22) Filed: Mar. 19, 2019

(65) Prior Publication Data
US 2019/0322273 A1    Oct. 24, 2019

(30) Foreign Application Priority Data

Mar. 19, 2018 (CN) .......................... 201810226772.5

(51) Int. Cl.
*B60W 30/09* (2012.01)
*B60T 8/17* (2006.01)
(Continued)

(52) U.S. Cl.
CPC ............ *B60W 30/09* (2013.01); *B60Q 5/006* (2013.01); *B60T 7/22* (2013.01); *B60T 8/171* (2013.01);
(Continued)

(58) Field of Classification Search
CPC .... B60W 30/09; B60W 30/04; B60W 10/184; B60W 10/20; B60W 2552/40;
(Continued)

(56) References Cited

U.S. PATENT DOCUMENTS 5,615,931 A * 4/1997 Stumpe ..................... B60T 8/00
303/22.1
2001/0037677 A1* 11/2001 Holst ................... B60T 8/17554
73/121

(Continued)

FOREIGN PATENT DOCUMENTS

CN        103153729 A      6/2013
CN        104129377 A      11/2014

OTHER PUBLICATIONS

Hassanzadeh et al.; Path and Speed Control of a Heavy Vehicle for Collision Avoidance Manoecvres; 2012 Intelligent Vehicle Sym. ; Alcala de Henares, Spain; Jun. 3-7, 2012 (Year: 2012).*

(Continued)

*Primary Examiner* — Michael J Zanelli
(74) *Attorney, Agent, or Firm* — Paul Liu; Julie J. Muyco; Perkins Coie, LLP

(57) ABSTRACT

The present disclosure provides an emergency braking system, an emergency braking method and a semitrailer, capable of improving the braking effect of the vehicle, thereby achieving improved safety for the vehicle. The system includes: a sensor component configured to collect sensed information on an environment where a semitrailer is located; and a braking controller configured to determine whether there is a risk of collision for the semitrailer based on the sensed information, and if so, calculate a maximum adhesive force that can be provided by a road surface the semitrailer is currently on, determine a first braking pressure corresponding to each wheel based on the maximum adhesive force and axle load information, and transmit to a braking system a first braking instruction carrying the first braking pressure for each wheel.

17 Claims, 15 Drawing Sheets

(51) Int. Cl.
    *B60T 7/22*     (2006.01)
    *B60W 10/184*     (2012.01)
    *B60W 10/20*     (2006.01)
    *B60T 8/171*     (2006.01)
    *B60T 8/172*     (2006.01)
    *B60T 8/1755*     (2006.01)
    *B60T 8/18*     (2006.01)
    *B60T 8/24*     (2006.01)
    *B60W 30/04*     (2006.01)
    *B60T 8/1763*     (2006.01)
    *B60Q 5/00*     (2006.01)

(52) U.S. Cl.
    CPC ............ *B60T 8/172* (2013.01); *B60T 8/1708* (2013.01); *B60T 8/17558* (2013.01); *B60T 8/17636* (2013.01); *B60T 8/1887* (2013.01); *B60T 8/246* (2013.01); *B60T 8/248* (2013.01); *B60W 10/184* (2013.01); *B60W 10/20* (2013.01); *B60W 30/04* (2013.01); *B60T 2210/12* (2013.01); *B60T 2220/04* (2013.01); *B60T 2250/00* (2013.01); *B60T 2260/02* (2013.01); *B60T 2260/09* (2013.01); *B60T 2270/10* (2013.01); *B60T 2270/304* (2013.01); *B60W 2030/043* (2013.01); *B60W 2300/145* (2013.01); *B60W 2520/18* (2013.01); *B60W 2530/10* (2013.01); *B60W 2540/12* (2013.01); *B60W 2540/18* (2013.01); *B60W 2552/40* (2020.02); *B60W 2556/00* (2020.02); *B60W 2710/182* (2013.01); *B60W 2710/20* (2013.01); *B60W 2720/18* (2013.01); *B60Y 2200/148* (2013.01); *B60Y 2300/02* (2013.01); *B60Y 2300/09* (2013.01)

(58) Field of Classification Search
    CPC ........... B60W 2300/145; B60W 50/14; B60W 2520/22; B60W 40/064; B60T 8/1708; B60T 8/172; B60T 8/17558; B60T 8/1887; B60T 8/248; B60T 8/17554; B60T 2270/304; B60T 2210/12; B60T 2230/06; B60T 7/20; B60Q 5/006; B60Y 2200/148; B60Y 2300/09
    See application file for complete search history.

(56) References Cited

U.S. PATENT DOCUMENTS

| 2017/0043753 | A1* | 2/2017 | Johnson | B60T 7/22 |
| 2017/0203744 | A1* | 7/2017 | Dagan | B60T 7/22 |
| 2018/0126931 | A1* | 5/2018 | Derag Rden | G05D 1/0295 |
| 2018/0319382 | A1* | 11/2018 | Laine | B60T 8/1761 |

OTHER PUBLICATIONS

No Author. Chinese Application No. 201810226772.5, Office Action dated Mar. 2, 2020, pp. 1-8.

No Author. Chinese Application No. 201810226772.5, First Search dated Feb. 21, 2020, pp. 1-2.

Third Office Action in Chinese Patent Application No. 201810226772.5 dated Mar. 3, 2021. Machine translation provided.

* cited by examiner

EMERGENCY BRAKING SYSTEM, EMERGENCY BRAKING METHOD AND SEMITRAILER

TECHNICAL FIELD

The present disclosure relates to vehicle braking technology, and more particularly, to an emergency braking system, an emergency braking method and a semitrailer.

BACKGROUND

In recent years, with the vigorous development of the automobile industry, automobiles have provided great convenience for social transportation. With the rapid growth of the number of automobiles owned by people, the traffic volume has gradually increased, and the resulting phenomena, such as traffic accidents, road congestions and environmental pollutions, have become more and more severe. Therefore, how to improve automobiles' safety performance and reduce road traffic accidents has become a social issue that attracts people's attention, and it is also a major problem that the Intelligent Transportation System (ITS) is trying to solve. As an important part of a human-vehicle-road transportation system, drivers have become a weak link in the system due to limitations of their own conditions. According to an accident data analysis report from the U.S. National Highway Traffic Safety Administration, the proportion of rear-end accidents caused by driver distraction in all accidents is as high as 68%. In these rear-end accidents, a driver assistance system can intervene when the automobiles are travelling in a longitudinal direction.

As an important part of the driver assistance system, an Autonomous Emergency Braking (AEB) System is designed to help drivers avoid or mitigate the risks of rear-end accidents. The European Union's new vehicle certification program has issued a test specification for AEB systems in 2014. Field testing schemes for the AEB City system and the AEB Inter-Urban system have been specified in detail and the test specification has become effective since 2014.

Current researches on algorithms for the AEB system mainly include early warning/braking algorithms based on collision time models, early warning/braking algorithms based on driver models, and early warning/braking algorithms based on safety distance models. Relevant products include Volvo's city safety system, Mercedes-Benz's PRE-SAFE system, Honda's collision mitigation braking system, Volkswagen's urban emergency braking system, and the like.

However, there are still some shortcomings in the current researches on the AEB system, as the AEB system uses a fixed braking policy. Each time a vehicle is braked in emergency, the same fixed braking pressure is applied to each wheel of the vehicle. However, in actual road environments, different types of road surfaces have different adhesion systems, that is, different types of road surfaces provide different maximum adhesive forces for one and the same vehicle. A series of problems may occur if the same fixed braking pressure is used to brake the wheels of the vehicle for different types of road surfaces. For example, when the fixed braking pressure is used to brake the wheels on a road surface having a small adhesive force, the braking distance of the vehicle may be too long to avoid collision with a vehicle in front. In addition, a semitrailer has a drive axle and a non-drive axle. If the same braking pressure is applied to wheels on different types of axles, the system may be unstable. Therefore, the braking effect of the existing AEB system is not optimal.

SUMMARY

The present disclosure provides an emergency braking system, an emergency braking method and a semitrailer, capable of improving the braking effect of the vehicle, thereby achieving improved safety for the vehicle.

In a first aspect, according to an embodiment of the present disclosure, an emergency braking system is provided. The system includes a sensor component and a braking controller communicatively connected with each other. The sensor component is configured to collect sensed information on an environment where a semitrailer is located. The braking controller is configured to determine whether there is a risk of collision for the semitrailer based on the sensed information, and if so, calculate a maximum adhesive force that can be provided by a road surface the semitrailer is currently on, determine a first braking pressure corresponding to each wheel based on the maximum adhesive force and axle load information, and transmit to a braking system a first braking instruction carrying the first braking pressure for each wheel.

In a second aspect, according to an embodiment of the present disclosure, a semitrailer is provided. The semitrailer includes the above emergency braking system.

In a third aspect, according to an embodiment of the present disclosure, an emergency braking method is provided. The method includes: collecting, by a sensor component, sensed information on an environment where a semitrailer is located; determining, by a braking controller, whether there is a risk of collision for the semitrailer based on the sensed information; and if so, calculating, by the braking controller, a maximum adhesive force that can be provided by a road surface the semitrailer is currently on, determining a first braking pressure corresponding to each wheel based on the maximum adhesive force and axle load information, and transmitting to a braking system a first braking instruction carrying the first braking pressure for each wheel.

With the solutions according to the present disclosure, when it is determined based on sensed information collected by a sensor component that there is a risk of collision for a semitrailer, a maximum adhesive force that can be provided by a road surface the semitrailer is currently on is calculated, a first braking pressure corresponding to each wheel is determined based on the maximum adhesive force and axle load information, a braking system is controlled to brake in accordance with the first braking pressure. With the solutions according to the present disclosure, on one hand, when an emergency brake is needed, the maximum adhesive force that can be provided by the road surface the semitrailer is currently on is calculated, and the braking pressure is calculated based on the maximum adhesive force, such that the calculated braking pressure can be more suitable for the type of the current road surface. In this way, the braking distance of the semitrailer can be more reasonable and accurate, such that the collision can be avoided while ensuring that the semitrailer can stop steadily. On the other hand, the maximum braking force the road surface can provide for the vehicle is proportional to the axle load. The braking pressure can be allocated based on the axle load information, such that the adhesive force provided by the road surface can be fully utilized. Moreover, the braking force allocated to the wheels on each axle is adapted to the load on the wheels, such that the stability of the braking system can be further improved.

DETAILED DESCRIPTION OF THE EMBODIMENTS

In the following, the present disclosure will be described in further detail with reference to the figures, such that the objects, solutions and advantages of the present disclosure will become more apparent. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The emergency braking system and emergency braking method according to the present disclosure are not only applicable to semitrailer, but also to other large vehicles such as trailers, trucks, freight vehicles, buses and the like. Those having ordinary skills in the art can apply the emergency braking system and emergency braking method according to the embodiments of the present disclosure to other large vehicles without substantive modifications to the solutions, for which no inventive efforts will be needed.

Figure 1:
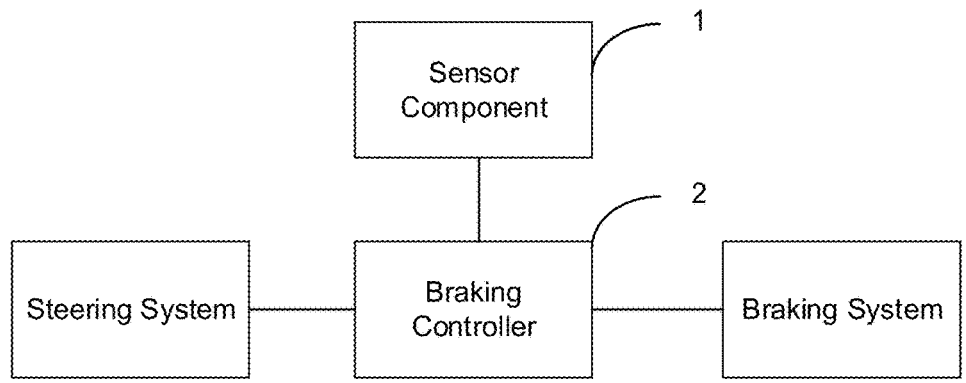
FIG. 1 is a first schematic diagram showing a structure of an emergency braking system according to an embodiment of the present disclosure.

FIG. 1 is a schematic diagram showing a structure of an emergency braking system according to an embodiment of the present disclosure. The emergency braking system is provided in a semitrailer and includes a sensor component 1 and a braking controller 2 communicatively connected with each other. The emergency braking system can be communicatively connected with a braking system and a steering system, which already exist in the semitrailer.

The sensor component 1 is configured to collect sensed information on an environment where the semitrailer is located.

The braking controller 2 is configured to determine whether there is a risk of collision for the semitrailer based on the sensed information, and if so, calculate a maximum adhesive force that can be provided by a road surface the semitrailer is currently on, determine a first braking pressure corresponding to each wheel based on the maximum adhesive force and axle load information, and transmit to a braking system a first braking instruction carrying the first braking pressure for each wheel, for instructing the braking system to brake each wheel in accordance with the first braking pressure for that wheel. In an embodiment of the present disclosure, the axle load information can be collected by an axle load sensor.

Figure 2:
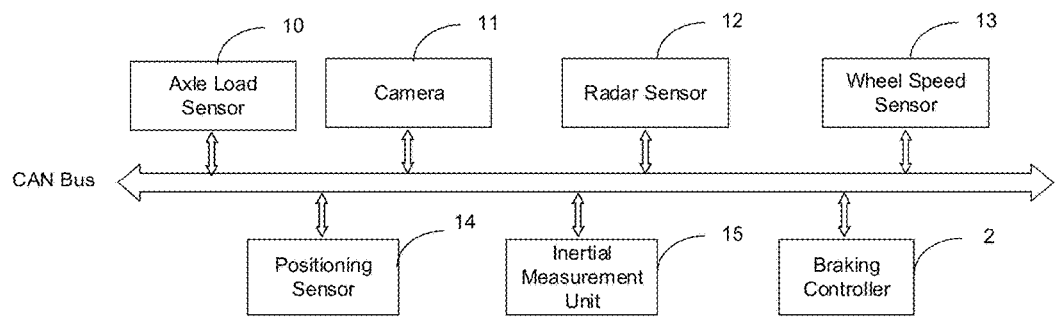
FIG. 2 is a second schematic diagram showing a structure of an emergency braking system according to an embodiment of the present disclosure.

In an embodiment of the present disclosure, the sensor component 1 can have a structure shown in FIG. 2, which includes an axle load sensor 10, a camera 11 (which can be a binocular camera), a radar sensor 12, a wheel speed sensor 13, a positioning sensor 14 and an inertial measurement unit 15. Here, the sensed information collected by the camera 11 include images, the sensed information collected by the radar sensor 12 (which may include a laser radar, a millimeter wave radar or an infrared radar) includes laser point cloud data, the sensed information collected by the wheel speed sensor 13 includes a wheel speed of each wheel, the sensed information collected by the positioning sensor 14 (which may include a GPS, GNSS or Beidou positioning system) includes information on a current position of the semitrailer, and the sensed information collected by the inertial measurement unit 15 includes information on a speed of the semitrailer.

Of course, in some application scenarios, if the semitrailer is not a fully self-driving vehicle and if each wheel is braked directly using the first braking pressure for that wheel, without warning, in response to determining that there is a risk, such emergency brake may cause physiological discomfort of a driver. Hence, in an embodiment of the present disclosure, when the braking controller 2 determines that there is a risk of collision, instead of directly transmitting the first braking instruction to the braking system, it can transmit to the braking system a number of braking instructions indicating gradually increasing braking forces each being smaller than the first braking pressure, before transmitting the first braking instruction. On one hand, it is to warn the driver to brake manually. On the other hand, it can avoid causing physiological discomfort of the driver by braking the wheels in emergency directly using the first braking pressure. If the driver can brake manually before the first braking pressure is transmitted, the first braking instruction will not be transmitted to the braking system. The first braking instruction will be transmitted to the braking system only when the driver still does not brake manually.

Figure 3:
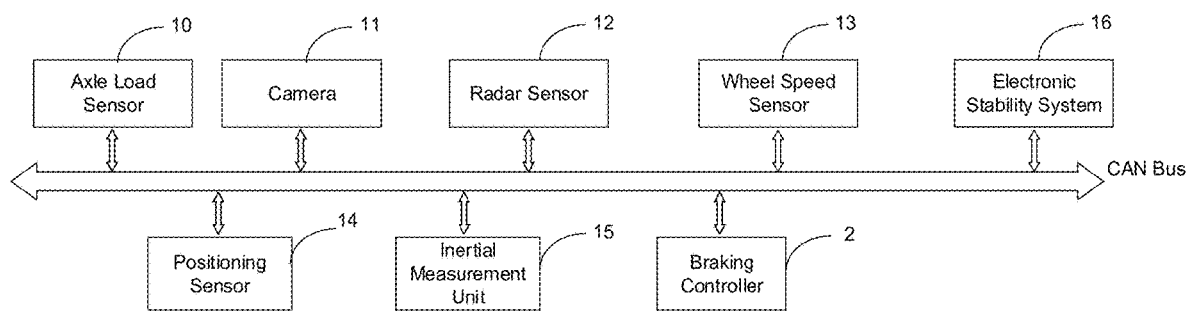
FIG. 3 is a third schematic diagram showing a structure of an emergency braking system according to an embodiment of the present disclosure.

In practice, typically two warnings will be preferred. Hence, in an embodiment of the present disclosure, before transmitting the first braking instruction, the braking controller 2 first tries to transmit to the braking system two braking instructions each carrying a braking force for each wheel that is smaller than the first braking pressure for that wheel. Thus, preferably, in the above embodiment, the sensor component 1 can further include an electronic stability system 16, as shown in FIG. 3. The electronic stability system 16 can collect sensed information including manual braking information indicating a braking operation on a braking pedal by the driver. The braking controller 2 can be further configured to, prior to calculating the maximum adhesive force that can be provided by the road surface the semitrailer is currently on:

determine whether the driver has performed a manual braking operation based on the manual braking information, and if not, transmit to the braking system a second braking instruction carrying a second braking pressure for each wheel, for instructing the braking system to brake each wheel in accordance with the second braking pressure for that wheel; or otherwise perform no operation;

continue determining whether the driver has performed a manual braking operation based on the manual braking information, and if not, transmit to the braking system a third braking instruction carrying a third braking pressure for each wheel, for instructing the braking system to brake each wheel in accordance with the third braking pressure for that wheel; or otherwise perform no operation; and continue determining whether the driver has performed a manual braking operation based on the manual braking information, and if not, calculate the maximum adhesive force that can be provided by the road surface the semitrailer is currently on.

Here, for each wheel, the second braking pressure is smaller than the third braking pressure, and the third braking pressure is smaller than the first braking pressure.

In an embodiment of the present disclosure, the respective time points at which the second braking instruction, the third braking instruction and the first braking instruction are transmitted to the braking system can be selected as follows. Collision time at which the collision would occur is estimated (e.g., based on a relative distance, a relative speed and a relative acceleration between an obstacle and the semitrailer (in an embodiment of the present disclosure, the relative distance, relative speed and relative acceleration between the obstacle and the semitrailer can be obtained by the radar sensor 12) and a calculated current speed of the semitrailer), three time points are selected sequentially within the collision time, and the second braking instruction, the third braking instruction and the first braking instruction are transmitted to the braking system at the three selected time points, respectively. For example, when the collision is estimated to occur 15 seconds later, the second braking instruction, the third braking instruction and the first braking instruction can be transmitted 1 second later, 5 seconds later and 10 seconds later, respectively.

Figure 4:
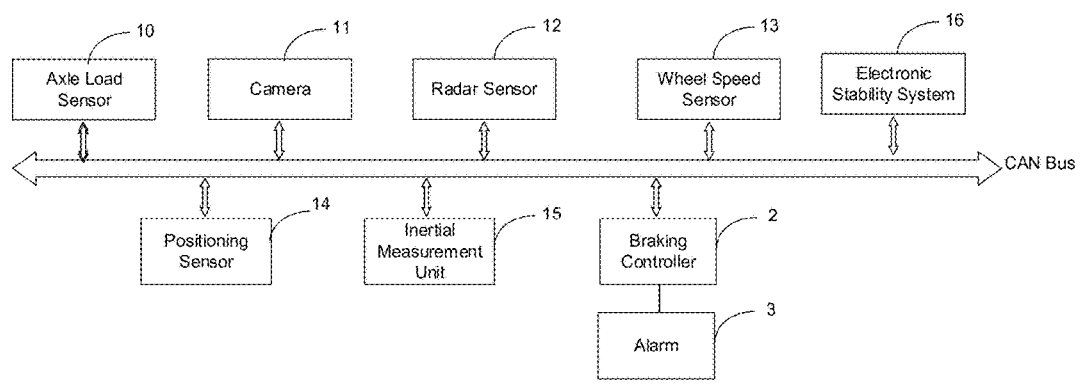
FIG. 4 is a fourth schematic diagram showing a structure of an emergency braking system according to an embodiment of the present disclosure.

Preferably, the above system shown in FIG. 1 may be further provided with an alarm communicatively connected with the braking controller 2. The braking controller 2 can control the alarm to provide a warning when determining that there is a risk of collision. For example, an alarm 3 can be provided in FIG. 2 and FIG. 3. In the above application scenario where the semitrailer is not a fully self-driving vehicle (i.e., there is a driver in the semitrailer), in order to further warn the driver to brake manually when determining that there is a risk of collision, in an embodiment of the present disclosure, the system shown in FIG. 3 may further include an alarm 3, as shown in FIG. 4, and the braking controller 2 can be further configured to control the alarm 3 to provide a warning when determining that there is a risk of collision. For example, the braking controller 2 can transmit a warning instruction to the alarm 3 and the alarm 3 can provide a warning in response to the warning instruction to further warn the driver to brake manually. The alarm 3 may provide a voice warning, a whistle warning or text warning information displayed on a Light Emitting Diode (LED) screen. Of course, in an embodiment of the present disclosure, the alarm 3 can be a human-machine interaction interface and the warning can be warning information displayed in form of a pop-up window on the human-machine interaction interface. The structure of the alarm and the type of warning can be set flexibly by those skilled in the art depending on actual requirements and the present disclosure is not limited thereto. An alarm 3 can also be provided in FIG. 2 and can transmit warning information to a remote monitoring server for the semitrailer and wait for the remote monitoring server to transmit processing instruction information. If the processing instruction information is received, processing is performed in accordance with the processing instruction information, without transmitting the first braking instruction to the braking system. If the processing instruction information is not received, the remote controller 2 transmits the first braking instruction to the braking system.

Figure 5:
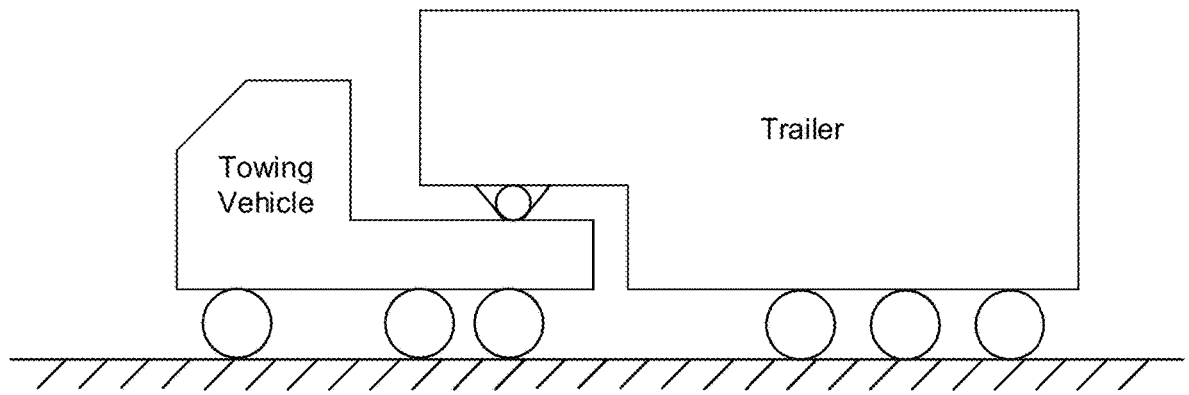
FIG. 5 is a schematic diagram showing a structure of a semitrailer according to an embodiment of the present disclosure.

As shown in FIG. 5, the semitrailer includes a towing vehicle (also referred to as head) and a trailer. In an embodiment of the present disclosure, the radar sensor 12 can be mounted at the front-end of the towing vehicle, e.g., on an air admission grille of an engine compartment of the towing vehicle or on the top of the towing vehicle. The camera 11 can be mounted at the front-end of the towing vehicle, e.g., at an upper rim of a windshield of a cockpit of the towing vehicle or on the top of the towing vehicle, such that the camera 11 can have a good angle of view for capturing the road environment in front of the semitrailer.

In an embodiment of the present disclosure, the braking controller 2 can determine whether there is a risk of collision for the semitrailer based on the sensed information in accordance with the following steps A1~A2.

At step A1, the braking controller 2 performs obstacle detection based on the sensed information to obtain an obstacle in front of the semitrailer and a relative distance, a relative speed and a relative acceleration between the obstacle and the semitrailer.

The step A1 can be, but not limited to be, implemented in the following two schemes.

Scheme a1: The obstacle in front of the semitrailer and the relative distance, relative speed and relative acceleration between the obstacle and the semitrailer can be obtained by processing binocular images captured by the camera 11 using an existing obstacle detection technique and an existing binocular ranging technique.

Scheme a2: The obstacle in front of the semitrailer and the relative distance, relative speed and relative acceleration between the obstacle and the semitrailer can be obtained by processing laser point cloud data fed back from the laser radar 12 using an existing obstacle detection technique.

At step A2, the braking controller 2 determines whether there is a risk of collision between the semitrailer and the obstacle based on the relative distance, relative speed and relative acceleration between the obstacle and the semitrailer.

In the step A2, collision time is calculated based on the relative distance, relative speed and relative acceleration between the obstacle and the semitrailer. If the collision time is larger than a predetermined collision time threshold, it is determined that there is no risk of collision; or otherwise it is determined that there is a risk of collision.

In an embodiment of the present disclosure, the braking controller 2 can calculate the maximum adhesive force that can be provided by the road surface the semitrailer is currently on, and determine the first braking pressure corresponding to each wheel based on the maximum adhesive force and the axle load information in accordance with the following steps B1~B5.

At step B1, an adhesive coefficient of the road surface the semitrailer is currently on is calculated.

At step B2, a load on each axle in the towing vehicle and the trailer is calculated based on the axle load information, and the load on each axle is averaged over the wheels on the axle to obtain a load corresponding to each wheel.

At step B3, the maximum adhesive force corresponding to each wheel is calculated based on the adhesive coefficient and the load on each wheel.

At step B4, a braking moment corresponding to each wheel is calculated based on the maximum adhesive force for that wheel and a rolling radius of that wheel.

At step B5, the first braking pressure for each wheel is determined based on the braking moment for that wheel, a sectional area of a brake pipe for that wheel, and a distance between a point at which a force is applied by a brake caliper or a brake drum and a center of that wheel.

In an embodiment of the present disclosure, the step B1 can be implemented as follows. At step b1, a slip rate of a drive-axle wheel and a slip rate of a non-drive-axle wheel (in embodiments of the present disclosure, each wheel on an axle of a drive-axle type in the semitrailer is referred to as a drive-axle wheel, and each wheel on an axle of a non-drive-axle type in the semitrailer is referred to as a non-drive-axle wheel) are calculated according to Equations (1) and (2) below, respectively. At step b2, a longitudinal force applied to the semitrailer while it is moving in a longitudinal direction is calculated according to Equation (3). At step b3, Equation (4) is converted into obtain Equations (5) and (6), and the longitudinal force calculated according to Equation (3) is substituted into Equation (6) to calculate a curve factor for the non-drive-axle wheel. At step b4, the adhesive coefficient of the road surface the semitrailer is currently on is calculated based on the curve factor for the non-drive-axle wheel and Equation (7).

$$s_{drive} = \frac{v - \omega_{drive} \cdot r_{drive}}{v} \quad (1)$$

$$s_{brake} = \frac{\omega_{brake} \cdot r_{brake} - v}{v} \quad (2)$$

In Equations (1) and (2), $s_{drive}$ is a dimensionless value and denotes the slip rate of the drive-axle wheel of the semitrailer, $s_{brake}$ is a dimensionless value and denotes the slip rate of the non-drive-axle wheel of the semitrailer, v denotes the longitudinal speed of the semitrailer in units of m/s, $\omega_{drive}$ denotes the wheel speed of the drive-axle wheel of the semitrailer in units of rad/s, $\omega_{brake}$ denotes the wheel speed of the non-drive-axle wheel of the semitrailer in units of rad/s, $r_{drive}$ denotes the radius of the drive-axle wheel of the semitrailer in units of m, and $r_{brake}$ denotes the radius of the non-drive-axle wheel of the semitrailer in units of m.

$$F_x = \delta m a_x + fmg + img + \frac{C_d A}{21.15} v^2 \quad (3)$$

In Equation (3), $F_x$ denotes the longitudinal force applied to the semitrailer in units of N, $\delta$ is a dimensionless value and denotes a rotating mass conversion coefficient, m denotes a total mass of the semitrailer in units of kg, $a_x$ denotes the longitudinal acceleration of the semitrailer in units of m/s$^2$, f is a dimensionless value and denotes a rolling resistance coefficient, g denotes the acceleration of gravity in units of m/s$^2$, i denotes a slope of the road in units of rad, $C_d$ is a dimensionless value and denotes an air resistance coefficient, and A is a frontal area of the vehicle in units of m$^2$. In Equation (3), m and A are fixed parameters of the semitrailer and $a_x$, f, i and $C_d$ can be measured by sensors.

$$F_x = F_{xdrive} + F_{xbrake} = k_{drive} F_{zdrive} s_{drive} + k_{brake} F_{zbrake} s_{brake} \quad (4)$$

In Equation (4), $F_x$ denotes the longitudinal force applied to the semitrailer in units of N, $F_{xdrive}$ denotes the longitudinal force applied to the drive axle of the semitrailer in units of N, $F_{xbrake}$ denotes the longitudinal force applied to the non-drive axle of the semitrailer in units of N, $k_{drive}$ is a dimensionless value and denotes a curve shape factor, $k_{brake}$ is a dimensionless value and denotes a curve shape factor, $F_{zdrive}$ denotes the longitudinal force applied to the towing vehicle in units of N, and $F_{zbrake}$ denotes the longitudinal force applied to the semitrailer in units of N.

Assuming $k_{drive} = \alpha k_{brake}$, Equation (4) can be converted into Equation (5) below:

$$F_x = k_{brake}(\alpha F_{zdrive} s_{drive} + F_{zbrake} s_{brake}) \quad (5)$$

$k_{brake}$ is identified by means of iterative least square to output y(t) and calculate a regression vector $\varphi(t)$, so as to obtain Equation (6), which is represented by the following equations collectively as:

$$y(t) = F_x(t)$$

$$\varphi(t) = (\alpha F_{zdrive} s_{drive} + F_{zbrake} s_{brake})$$

-continued $$e(t) = y(t) - \varphi(t)^T \theta(t-1)$$

$$K(t) = \frac{P(t-1)\varphi(t)}{I + \varphi(t)^T P(t-1)\varphi(t)}$$

$$P(t) = P(t-1) - \frac{P(t-1)\varphi(t)\varphi(t)^T P(t-1)}{I + \varphi(t)^T P(t-1)\varphi(t)}$$

$$\theta(t) = \theta(t-1) + K(t)e(t)$$

where θ is the estimated value of $k_{brake}$.

$$\mu a k_{brake} + b \quad (7)$$

In Equation (7), μ is a dimensionless value and denotes the adhesive coefficient of the current road surface, and a and b are predetermined parameters associated with the semitrailer.

In an embodiment of the present disclosure, after the adhesive coefficient of the current road surface has been calculated, the above collision time threshold can be adjusted based on the adhesive coefficient. For example, the collision time threshold can be increased when the adhesive coefficient is small, or the collision time threshold can be decreased when the adhesive coefficient is large.

In an embodiment of the present disclosure, in the above step B2, a peak factor corresponding to each wheel can be calculated based on the adhesive coefficient and the load on that wheel. The peek factor can be substituted into Equation (8) to calculate the maximum adhesive force for each wheel:

$$F_{xmax} = D \cos[C \tan^{-1}\{Bx - E(Bx - \tan^{-1}(Bx))\}] \quad (8)$$

where $F_{xmax}$ denotes the maximum adhesive force corresponding to the wheel, x is a dimensionless value and denotes a general slip rate of the wheel, B denotes a rigidness factor of the wheel, C denotes a shape factor of the wheel, D denotes the peak factor of the wheel, and E denotes a curvature factor of the wheel. In an embodiment of the present disclosure, x, B, C, D and E can be calculated according to an existing tyre equation (9), which is represented by the following equations collectively as:

$$x = s + SH_x$$

$$C = pCx_1 \cdot \lambda C_x$$

$$D = \mu_x F_z$$

$$\mu_x = (pDx_1 + pDx_2 \cdot df_z) \cdot (1 - pDx_3 \cdot \gamma^2) \cdot \lambda_{\mu x}$$

$$E = (pEx_1 + pEx_2 \cdot df_z + pEx_3 \cdot df_z^2) \cdot \{1 - pEx_4 \text{sgn}(x)\} \cdot \lambda_{Ex}$$

$$K_x = F_z \cdot (pKx_1 + pKx_2 \cdot df_z) \cdot \exp(pKx_3 \cdot df_z) \cdot \lambda_{Kx}$$

$$K_x = B \cdot C \cdot D = \frac{\partial F_{x0}}{\partial x} \text{ at } x = 0$$

$$B = K_x / (C \cdot D)$$

$$SH_x = (pHx_1 + pHx_2 \cdot df_z) \cdot \lambda_{Hx}$$

$$SV_x = F_z \cdot (pVx_1 + pVx_2 + \cdot df_z) \cdot \lambda_{Vx} \cdot \lambda_{\mu x}$$

where s is a dimensionless value and denotes an actual slip rate of the wheel, $SH_x$ is an offset, $pCx_1$ is a shape factor, $\lambda C_x$ is a shape factor of the longitudinal force, $F_z$ is the load on the wheel, $pDx_1$ is a longitudinal friction factor for the rated load, $pDx_2$ is a load correction item, $df_z$ is a load variation rate, $pDx_3$ is a wheel alignment correction item, γ is a camber angle of the wheel, $\lambda_{Ex}$ is a peak coefficient of the longitudinal force, $pEx_1$ is a curvature factor for the rated load, $pEx_2$ is a load correction item, $df_z$ is a load variation rate, $K_x$ is a corrected longitudinal slip rigidness, $pKx_1$ is a longitudinal slip rigidness of the wheel for the rated load, $pKx_2$ is a load correction proportional coefficient, $pKx_3$ is a load correction exponential coefficient, $\lambda_{Kx}$ is a longitudinal slip rigidness, $pHx_1$ is a horizontal offset for the rated load, $pHx_2$ is an offset correction item, $\lambda_{Hx}$ is a horizontal offset coefficient, $pVx_1$ is a longitudinal offset for the rated load, $pVx_2$ is a load offset correction coefficient, $\lambda_{Vx}$ is a vertical offset coefficient, and $\lambda_{\mu x}$ is a peak coefficient of the longitudinal force.

In the step B4, the braking moment for each wheel can be calculated according to Equation (10) below:

$$M_b = F_{xmax} r \quad (10)$$

where $F_{xmax}$ denotes the maximum adhesive force corresponding to the wheel, $M_b$ denotes the braking moment corresponding to the wheel, and r denotes the rolling radius of the wheel.

In the step B5, the braking pressure for each wheel can be calculated according to Equation (11) below:

$$P_b = \frac{M_b}{Sr_b} \quad (11)$$

where $P_b$ denotes the braking pressure corresponding to the wheel, S denotes the sectional area of the brake pipe for the wheel, and $r_b$ denotes a distance between the point at which the force is applied by the brake caliper or the brake drum and the center of that wheel.

Figure 6:
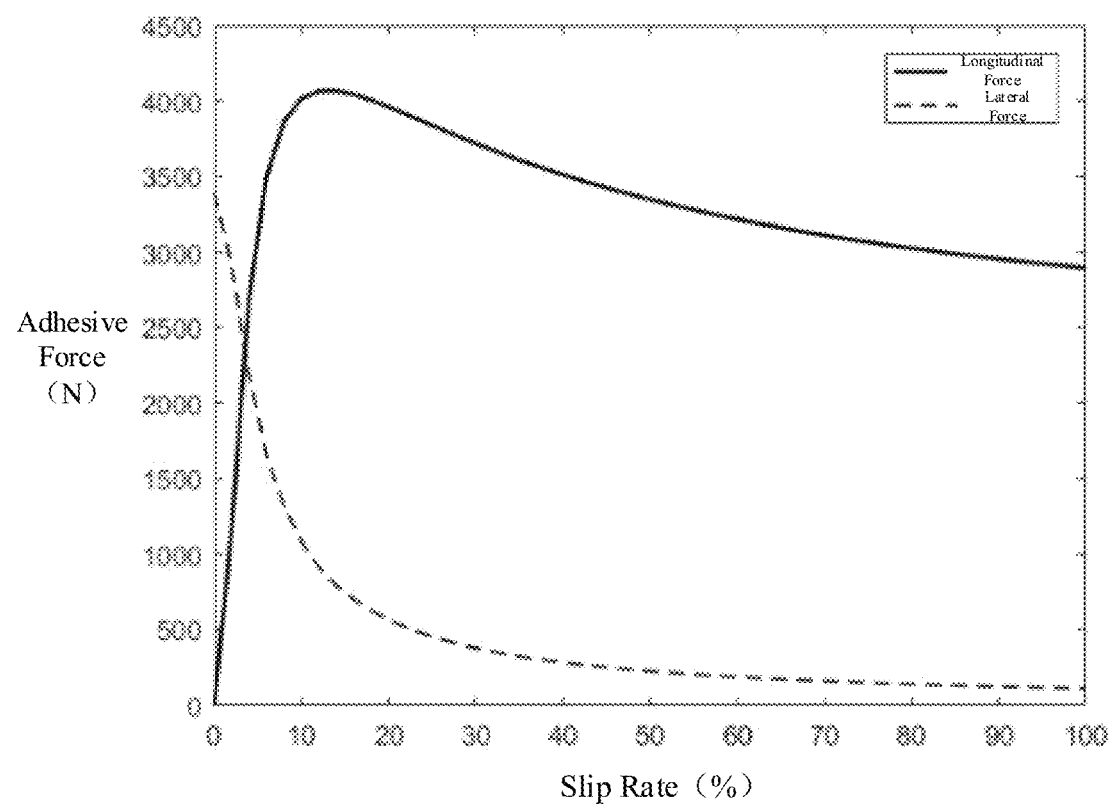
FIG. 6 is a graph showing a curve of relation between a slip rate of a wheel and an adhesive force for the wheel according to an embodiment of the present disclosure.

In practice, there is a certain curve relation between the slip rate of the wheel and the adhesive force of the road surface, as shown in FIG. 6. An ideal slip rate interval is 10%~20%, in which the wheel can have a large adhesive force. In an embodiment of the present disclosure, in order to fully utilize the maximum adhesive force, in the above step B 1, the following step can be performed after the step b1 and before the step b2. After the slip rates of the wheels have been calculated according to Equations (1) and (2), it is determined whether the slip rate of each wheel is in the ideal slip rate interval. If so, no adjustment is performed to the slip rate of the wheel; or otherwise the slip rate of the wheel is adjusted to the ideal slip rate interval and the subsequent steps will be performed based on the adjusted slip rate of each wheel. With such optimization, after each wheel is braked in accordance with the first braking pressure for that wheel as subsequently calculated, the actual operating slip rate of each wheel will gradually fall into the ideal slip rate interval.

Figure 7:
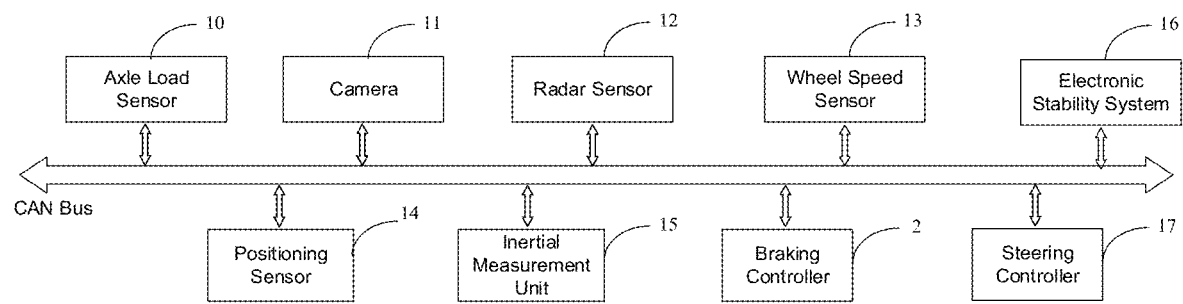
FIG. 7 is a fifth schematic diagram showing a structure of an emergency braking system according to an embodiment of the present disclosure.
Figure 8:
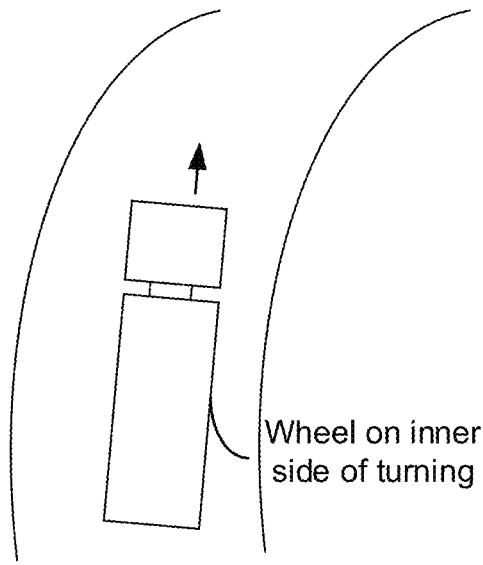
FIG. 8 is a schematic diagram showing a wheel on an inner side of turning in a left turn according to an embodiment of the present disclosure.
Figure 9:
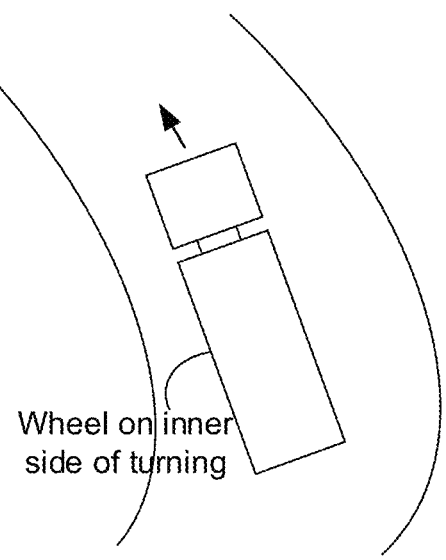
FIG. 9 is a schematic diagram showing a wheel on an inner side of turning in a right turn according to an embodiment of the present disclosure.

In an embodiment of the present disclosure, in addition to the sensors shown in FIGS. 3 and 4, the sensor component 1 can further include a steering sensor 17. The steering sensor 17 can be included in FIG. 3, as shown in FIG. 7, and configured to collect sensed information including a steering angle of a steering wheel, i.e., the steering sensor 17 can collect a steering angle of an operation of the steering wheel by the driver. Before transmitting to the braking system the first braking instruction, the braking controller 2 can be further configured to: determine whether the collision can be avoided by turning based on the steering angle (In an example, a movement trajectory of the semitrailer can be estimated based on the condition of the semitrailer and it can be determined whether the obstacle is in the movement trajectory. If so, it is determined that the collision cannot be avoided; or otherwise it is determined that the collision can be avoided. In another example, a movement trajectory of the semitrailer can be estimated based on the condition of the semitrailer and it can be determined whether a vertical distance between the current position of the obstacle and the movement trajectory is smaller than a predetermined distance threshold. If so, it is determined that the collision cannot be avoided; or otherwise it is determined that the collision can be avoided); if so, perform no operation, or otherwise transmit to the braking system a fourth braking instruction carrying a fourth braking pressure for each wheel of the towing vehicle that is on an inner side of the turning, determine whether the collision can be avoided by the braking system braking each wheel of the towing vehicle that is on the inner side of the turning in accordance with the fourth braking instruction, and if not, transmit to the braking system the first braking instruction carrying the first braking pressure for each wheel. As shown in FIG. 8, assuming that the semitrailer turns left, a wheel on the inner side of the turning refers to a wheel on the left side. As shown in FIG. 9, assuming that the semitrailer turns right, a wheel on the inner side of the turning refers to a wheel on the right side.

In an embodiment of the present disclosure, the value of the fourth braking pressure can be a predetermined value or can be determined based on a current actual movement status of the semitrailer and a reference movement status. In an implementation, the fourth braking pressure can be determined based on the actual current movement status of the semitrailer and the reference movement status as follows. An additional yaw moment of the semitrailer can be determined based on feedback of the error between the actual movement status of the semitrailer and the reference movement status, and the fourth braking pressure corresponding to each wheel of the towing vehicle that is on the inner side of the turning can be calculated according to Equation (11) and the additional yaw moment. In an implementation, the additional yaw moment of the semitrailer can be calculated as follows. 1) The actual movement status of the semitrailer can be obtained by the positioning sensor 14 and the inertial measurement unit 15 (the actual movement status information may include a slip angle of the center of mass, a yaw velocity, a roll angle and a roll velocity of the towing vehicle, and a slip angle of the center of mass, a yaw velocity, a roll angle and a roll velocity of the trailer). 2) A reference movement status of the semitrailer is calculated based on a predetermined simplified vehicle model (the reference movement status information may include a reference slip angle of the center of mass, a reference yaw velocity, a reference roll angle and a reference roll velocity of the towing vehicle, and a reference slip angle of the center of mass, a reference yaw velocity, a reference roll angle and a reference roll velocity of the trailer). 3) An optimal control target function is selected, and the additional yaw moment of the semitrailer is determined based on feedback of the error between the actual movement status of the semitrailer and the reference movement status.

In an embodiment of the present disclosure, the selected optimal control target function can be:

$$J = \frac{1}{2}\int (y-y_d)^T Q(y-y_d)^T Q(y-y_d) + u^T R u \, dt \quad (12)$$

here y is a vector consisting of the current actual movement status information of the semitrailer, $y_d$ is a vector consisting of the current reference movement status information of the semitrailer, u is the additional yaw moment and Q and R are weighting matrices.

In an embodiment of the present disclosure, in the system shown in FIG. 7 or FIG. 2, when it is determined that the collision can be avoided by turning, various problems such as rollover, folding or rear-end swing may occur when the semitrailer is turning. Hence, in order to avoid the risk of rollover, folding or rear-end swing when the semitrailer is turning, the steering controller 2 can determine whether there is a risk of rollover, folding or rear-end swing for the semitrailer when the semitrailer is turning based on the sensed information collected by the sensor, and perform a brake control for the wheels of the semitrailer when there is such risk, so as to avoid the risk of rollover, folding or rear-end swing for the semitrailer.

Figure 10:
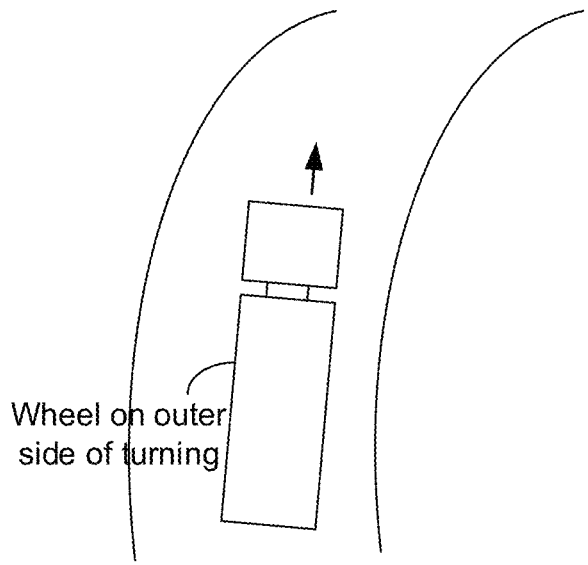
FIG. 10 is a schematic diagram showing a wheel on an outer side of turning in a left turn according to an embodiment of the present disclosure.
Figure 11:
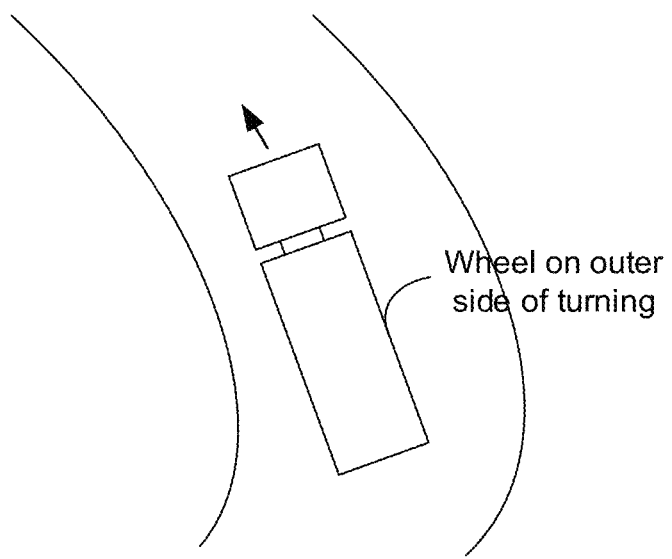
FIG. 11 is a schematic diagram showing a wheel on an outer side of turning in a right turn according to an embodiment of the present disclosure.

In an embodiment of the present disclosure, the sensed information collected by the inertial measurement unit 15 may further include a roll angle and a roll velocity of the trailer. The braking controller 2 can be further configured to, while the semitrailer is turning: determine whether there is a risk of rollover for the semitrailer based on the roll angle and roll velocity of the trailer, and if so, transmit to the braking system a fifth braking instruction carrying a fifth braking pressure for each wheel on an outer side of the turning, for instructing the braking system to brake each wheel on the outer side of the turning in accordance with the fifth braking pressure for that wheel. As shown in FIG. 10, assuming that the semitrailer turns left, a wheel on the outer side of the turning refers to a wheel on the right side. As shown in FIG. 11, assuming that the semitrailer turns right, a wheel on the outer side of the turning refers to a wheel on the left side. In an embodiment of the present disclosure, the fifth braking pressure for each wheel on the outer side of the turning can be a predetermined value or can be determined according to the same principle as the above method for calculating the fourth braking pressure, and the details thereof will be omitted here.

When the semitrailer is turning, the inertial measurement unit 15 can measure the roll angle, roll velocity, yaw angle and yaw velocity of each of the towing vehicle and the trailer. Generally, the semitrailer may roll over when it is fully loaded and the trailer may roll over first and cause the towing vehicle to roll over. Hence, in an embodiment of the present disclosure, rollover time can be calculated based on the roll angle and roll velocity of the trailer, as follows.

First, a load transfer rate is calculated according to Equation (13) below, and it is determined whether there is a risk of rollover based on the load transfer rate. If so, the rollover time is calculated according to Equation (14) below; or otherwise no operation is performed.

$$LTR = -\frac{2(c\dot{\phi} + k\phi)}{mgT} \quad (13)$$

In Equation (13), LTR denotes the load transfer rate, c denotes a roll damping of the trailer, $\dot{\phi}$ denotes the roll velocity of the trailer, k denotes a roll rigidity of the trailer, $\phi$ denotes the roll angle of the trailer, m denotes a mass of the trailer, g denotes the acceleration of gravity, and T denotes a distance between wheels.

The braking controller 2 can determine whether there is a risk of rollover as follows. It is determined that the load transfer rate calculated according to Equation (13) is in a predetermined value interval (which can be set as e.g., −0.5~+0.5, the value interval can be set flexibly by those skilled in the art depending on actual requirements and the present disclosure is not limited thereto), which indicates a force balance between the wheels on the axles. If so, it is determined that there is no risk of rollover; or otherwise it is determined that there is a risk of rollover.

Then, LTR is deduced forward based on a predetermined simplified vehicle model, with a step of T. If a vehicle rollover condition is met when it is deduced forward by N steps, the rollover time can be calculated according to:

$$TTR = NT_s \qquad (14)$$

Figure 12:
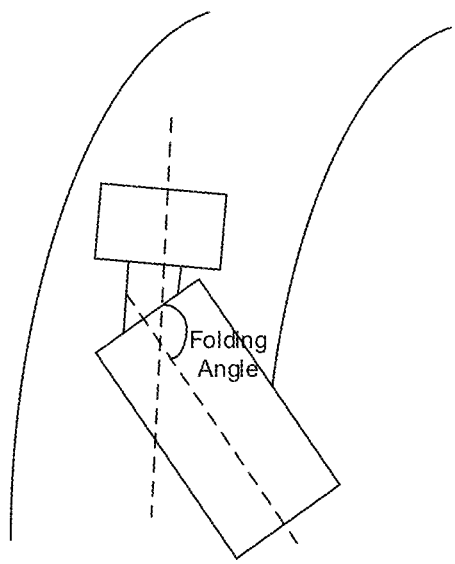
FIG. 12 is a schematic diagram showing a maximum folding angle between a towing vehicle and a trailer according to an embodiment of the present disclosure.

In an embodiment of the present disclosure, the braking controller 2 can be further configured to, while the semitrailer is turning: calculate a maximum folding angle between the towing vehicle and the trailer (as shown in FIG. 12), determine whether the maximum folding angle is larger than a first predetermined angle threshold; and if so, determine that there is a risk of folding between the towing vehicle and the trailer and transmit to the braking system a sixth braking instruction carrying a sixth braking pressure for each wheel of the towing vehicle that is on an outer side of the turning, for instructing the braking system to brake each wheel on the outer side of the turning in accordance with the sixth braking pressure for that wheel. In an embodiment of the present disclosure, the sixth braking pressure for each wheel on the outer side of the turning can be a predetermined value or can be determined according to the same principle as the above method for calculating the fourth braking pressure, and the details thereof will be omitted here.

Figure 13:
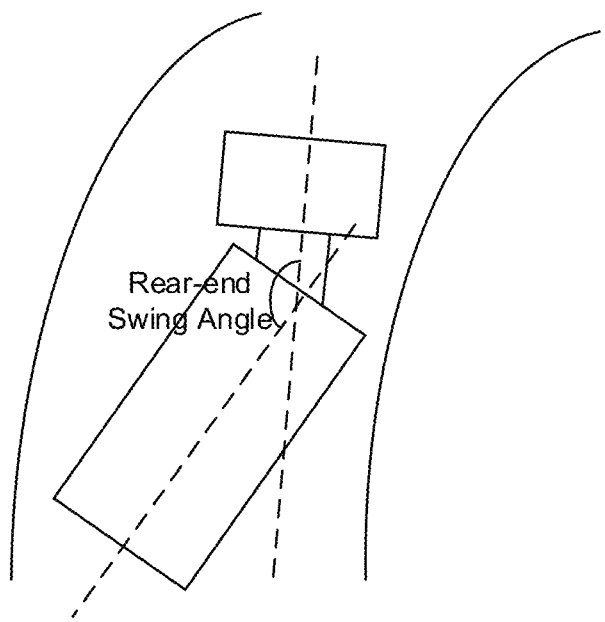
FIG. 13 is a schematic diagram showing a maximum rear-end swing angle of a semitrailer according to an embodiment of the present disclosure.

In an embodiment of the present disclosure, the braking controller 2 can be further configured to, while the semitrailer is turning: calculate a maximum rear-end swing angle of the semitrailer (as shown in FIG. 13); determine whether the maximum rear-end swing angle is larger than a second predetermined angle threshold; and if so, determine that there is a risk of rear-end swing for the semitrailer and transmit to the braking system a braking release instruction instructing the braking system to release the braking pressure on each wheel of the trailer.

In an embodiment of the present disclosure, in order to avoid a single-axle locking problem when the braking system brakes each wheel in accordance with the first braking pressure for that wheel, the braking controller 2 can be further configured to, while the braking system is braking each wheel in accordance with the first braking pressure for that wheel: calculate a slip rate for each wheel of the semitrailer, and adjust the first braking pressure corresponding to each wheel based on the slip rate for that wheel. For example, when the current slip rate of a wheel is larger than the ideal slip rate interval, the first braking pressure for the wheel can be decreased. When the current slip rate of a wheel is smaller than the ideal slip rate interval, the first braking pressure for the wheel can be increased. When the current slip rate of a wheel is in the ideal slip rate interval, no adjustment can made to the first braking pressure for the wheel.

In an embodiment of the present disclosure, the axle load sensor 10, the positioning sensor 14, the inertial measurement unit 15, the steering sensor 17, the wheel speed sensor 13, the electronic stability system 16, the braking controller 2, the radar sensor 12 and the camera 11 can be connected in a vehicle mounted Controller Area Network (CAN) of the semitrailer and communicate information via a CAN bus. Of course, in an embodiment of the present disclosure, the axle load sensor 10, the positioning sensor 14, the inertial measurement unit 15, the steering sensor 17, the wheel speed sensor 13, the electronic stability system 16, the braking controller 2, the radar sensor 12 and the camera 11 can communicate information via WiFi or wired connections, and the present disclosure is not limited thereto. The braking controller 2 can communicate information with the steering system and the braking system via a CAN bus.

Embodiment 2

According to Embodiment 2 of the present disclosure, a semitrailer is provided. The semitrailer includes any of the emergency braking systems according to Embodiment 1. The details of the structure of the semitrailer will be omitted here.

Embodiment 3

Figure 14:
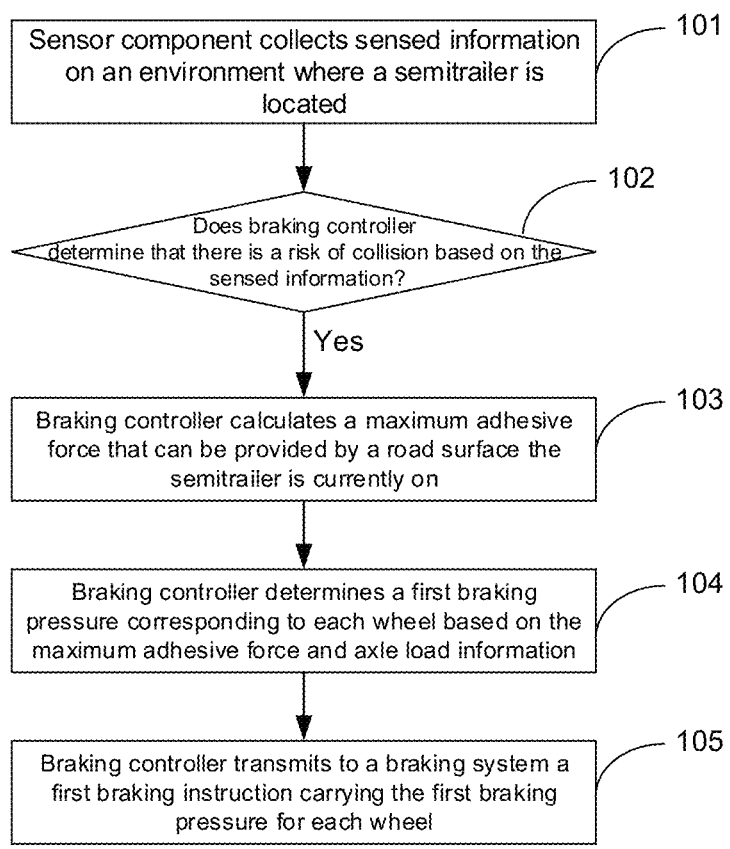
FIG. 14 is a first flowchart illustrating an emergency braking method according to an embodiment of the present disclosure.

Based on the same concept as the emergency braking system according to the above Embodiment 1, in Embodiment 3 of the present disclosure, an emergency braking method is provided. The process flow of the method is shown in FIG. 14, which includes the following steps.

At step 101, a sensor component collects sensed information on an environment where a semitrailer is located.

At step 102, a braking controller determines whether there is a risk of collision for the semitrailer based on the sensed information, and if so, performs steps 103~105.

At step 103, the braking controller calculates a maximum adhesive force that can be provided by a road surface the semitrailer is currently on.

At step 104, the braking controller determines a first braking pressure corresponding to each wheel based on the maximum adhesive force and axle load information.

At step 105, the braking controller transmits to a braking system a first braking instruction carrying the first braking pressure for each wheel.

Figure 15:
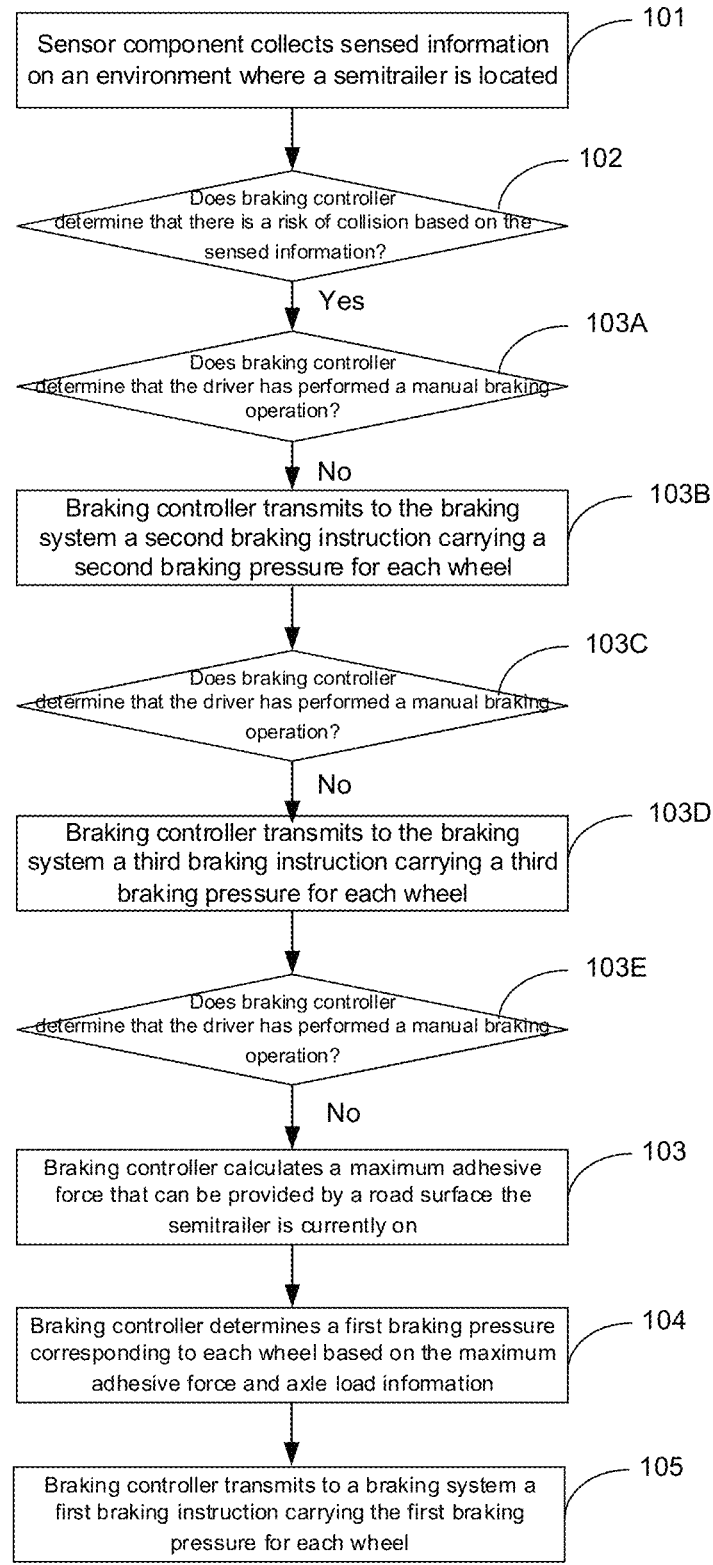
FIG. 15 is a second flowchart illustrating an emergency braking method according to an embodiment of the present disclosure.

Preferably, in an embodiment of the present disclosure, the above process flow shown in FIG. 14 may further include steps 103A~103E before the step 103, as shown in FIG. 15.

In the step 102, when there is a risk of collision, the braking controller performs the steps 103A~103E.

At step 103A, the braking controller determines whether the driver has performed a manual braking operation based on the manual braking information, and if not, performs step 103B; or otherwise performs no operation.

At step 103B, the braking controller transmits to the braking system a second braking instruction carrying a second braking pressure for each wheel.

At step 103C, the braking controller continues determining whether the driver has performed a manual braking operation based on the manual braking information, and if not, performs step 103D; or otherwise performs no operation.

At step 103D, the braking controller transmits to the braking system a third braking instruction carrying a third braking pressure for each wheel.

At step 103E, the braking controller continues determining whether the driver has performed a manual braking operation based on the manual braking information, and if not, performs step 103; or otherwise performs no operation.

Here, for each wheel, the second braking pressure is smaller than the third braking pressure, and the third braking pressure is smaller than the first braking pressure.

Figure 16:
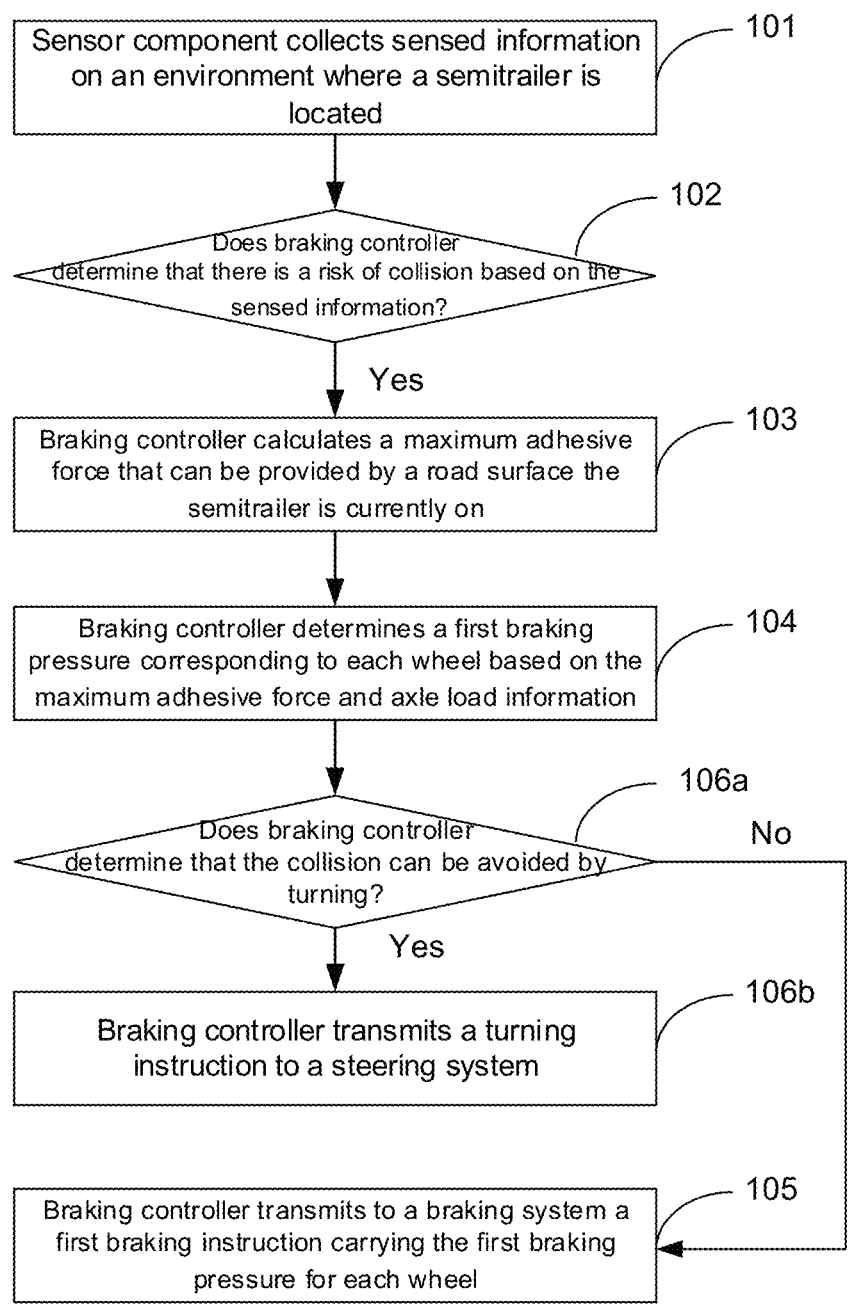
FIG. 16 is a third flowchart illustrating an emergency braking method according to an embodiment of the present disclosure.

In an embodiment of the present disclosure, the above process flow shown in FIG. 14 may further include steps 106a~106b after the step 104, as shown in FIG. 16.

At step 106a, the braking controller determines whether the collision can be avoided by turning, and if so, performs step 106b; or otherwise performs step 105.

At step 106b, the braking controller transmits a turning instruction to a steering system. The turning instruction carries a steering angle of the steering wheel. The braking controller can calculate the steering angle of the steering wheel using a method known in the related art and the present disclosure is not limited thereto.

Figure 17:
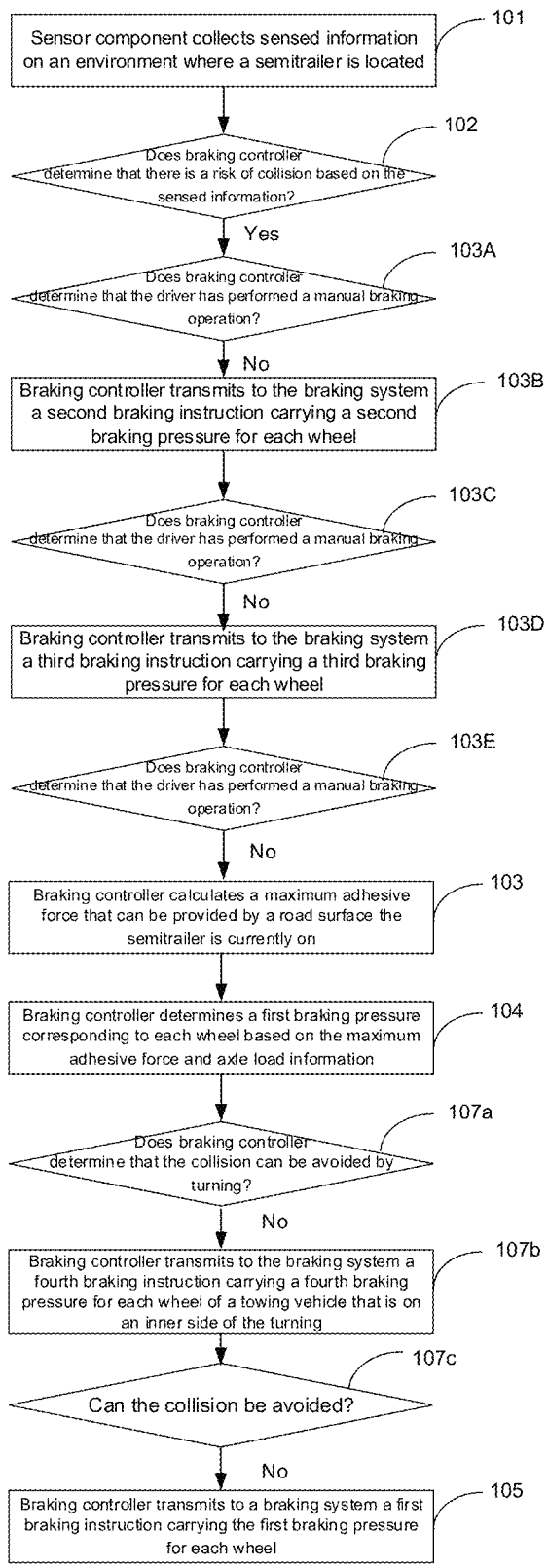
FIG. 17 is a fourth flowchart illustrating an emergency braking method according to an embodiment of the present disclosure.

In an embodiment of the present disclosure, the sensed information may include the steering angle of the steering wheel, and the above process flow shown in FIG. 15 may further include steps 107a~107c after the step 104, as shown in FIG. 17.

At step 107a, the braking controller determines whether the collision can be avoided by turning based on the steering angle, and if not, performs step 107b; or otherwise performs no operation.

At step 107b, the braking controller transmits to the braking system a fourth braking instruction carrying a fourth braking pressure for each wheel of a towing vehicle that is on an inner side of the turning.

At step 107c, the braking controller determines whether the collision can be avoided by the braking system braking each wheel of the towing vehicle that is on the inner side of the turning in accordance with the fourth braking instruction, and if not, performs the step 105; or otherwise performs no operation.

For details regarding how to determine the value of the fourth braking pressure, reference can be made to the relevant content in Embodiment 1 and the description thereof will be omitted here.

Figure 18:
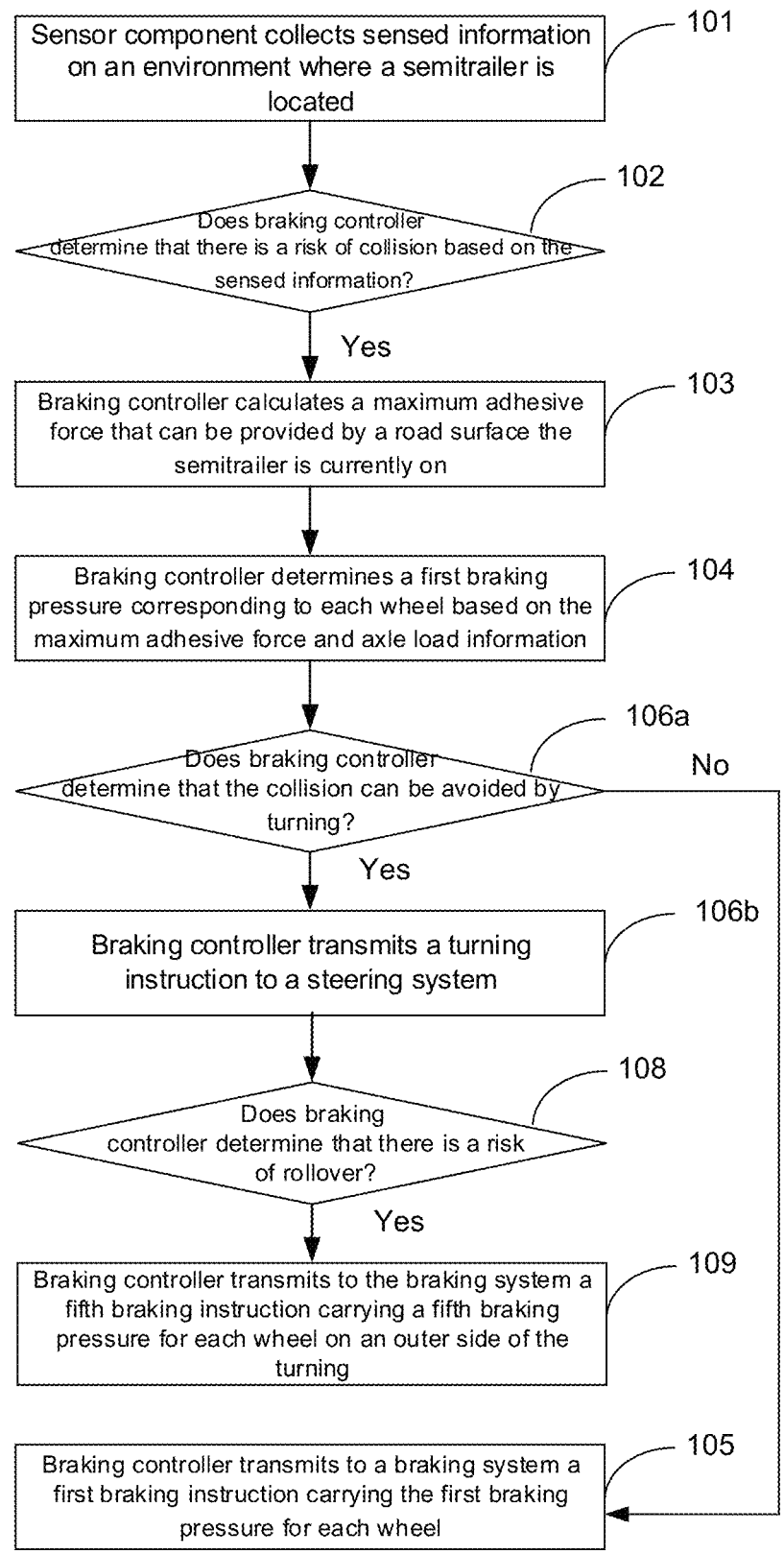
FIG. 18 is a fifth flowchart illustrating an emergency braking method according to an embodiment of the present disclosure.

In an embodiment of the present disclosure, the sensed information may include a roll angle and a roll velocity of a trailer, and the method shown in FIG. 16 or 17 may further include steps 108~109. For example, the method shown in FIG. 16 may further include steps 108~109, as shown in FIG. 18.

At step 108, the braking controller determines whether there is a risk of rollover for the semitrailer based on the roll angle and roll velocity of the trailer, and if so, performs step 109; or otherwise performs no operation.

At step 109, the braking controller transmits to the braking system a fifth braking instruction carrying a fifth braking pressure for each wheel on an outer side of the turning.

For details regarding how to determine the value of the fifth braking pressure, reference can be made to the relevant content in Embodiment 1 and the description thereof will be omitted here.

Figure 19:
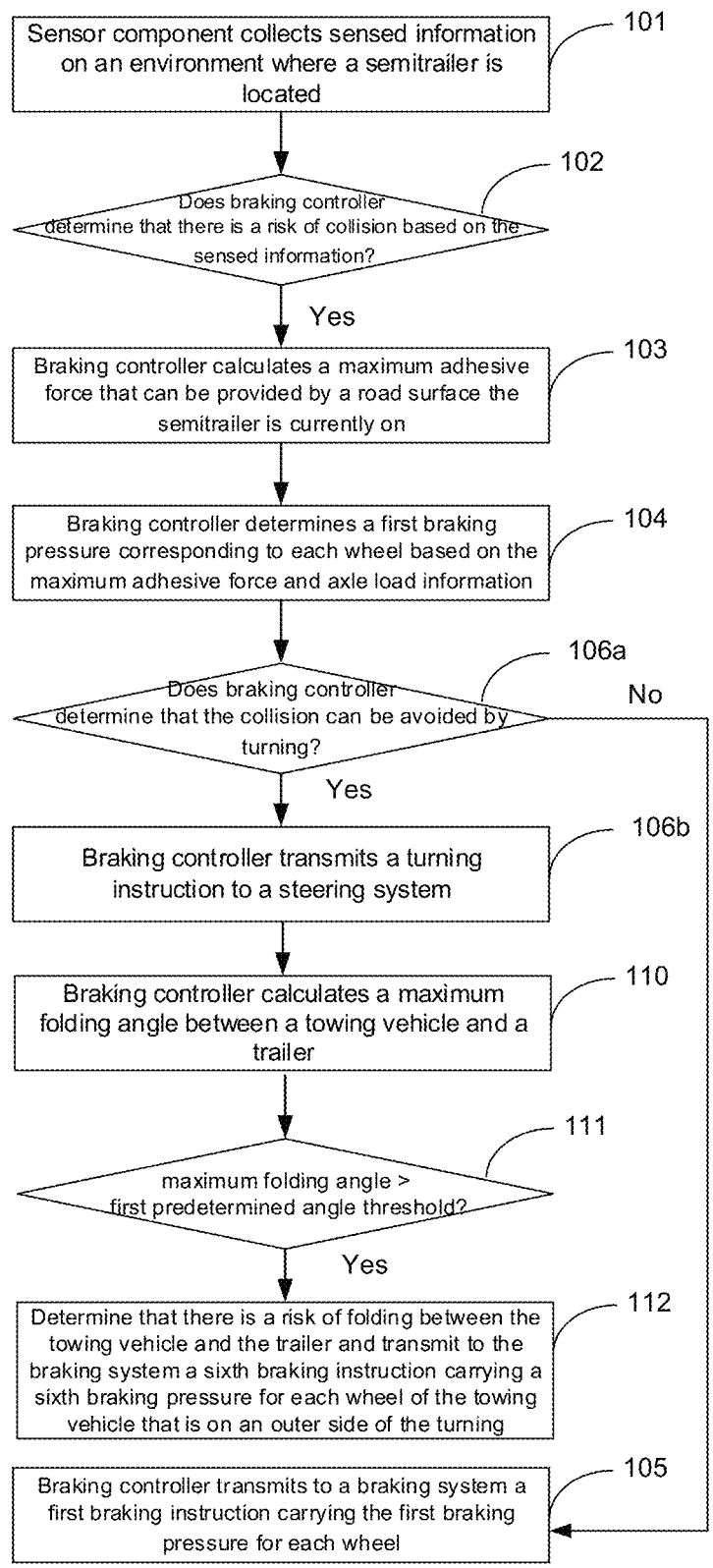
FIG. 19 is a sixth flowchart illustrating an emergency braking method according to an embodiment of the present disclosure.

In an embodiment of the present disclosure, the method shown in FIG. 16,17 or 18 may further include steps 110~112. For example, the method shown in FIG. 16 may further include steps 110~112, as shown in FIG. 19.

At step 110, the braking controller calculates a maximum folding angle between a towing vehicle and a trailer.

At step 111, the braking controller determines whether the maximum folding angle is larger than a first predetermined angle threshold; and if so, performs step 112; or otherwise performs no operation.

At step 112, the braking controller determines that there is a risk of folding between the towing vehicle and the trailer and transmits to the braking system a sixth braking instruction carrying a sixth braking pressure for each wheel of the towing vehicle that is on an outer side of the turning.

For details regarding how to determine the value of the sixth braking pressure, reference can be made to the relevant content in Embodiment 1 and the description thereof will be omitted here.

Figure 20:
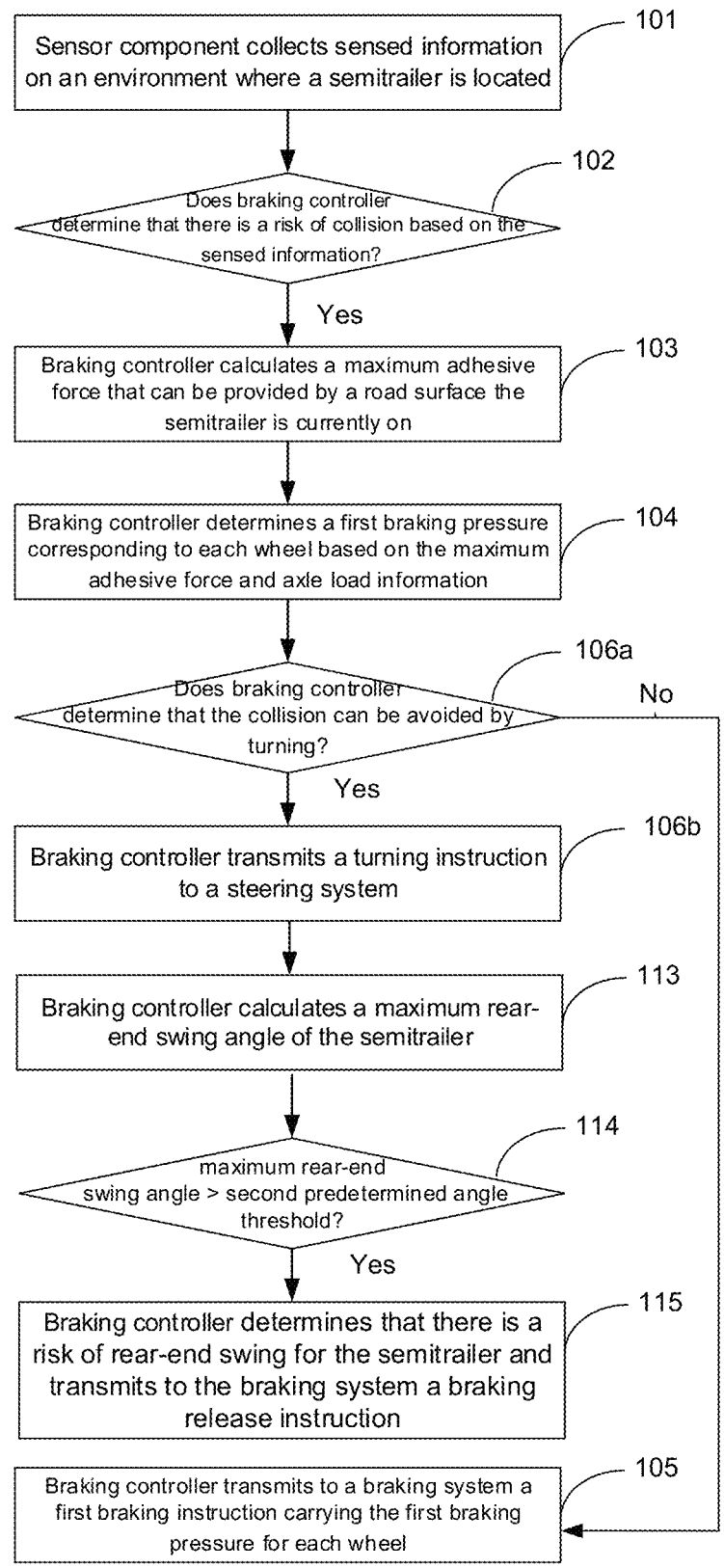
FIG. 20 is a seventh flowchart illustrating an emergency braking method according to an embodiment of the present disclosure.

In an embodiment of the present disclosure, the method shown in any of FIGS. 16~19 may further include steps 113~115. For example, the method shown in FIG. 16 may further include steps 113~115, as shown in FIG. 20.

At step 113, the braking controller calculates a maximum rear-end swing angle of the semitrailer.

At step 114, the braking controller determines whether the maximum rear-end swing angle is larger than a second predetermined angle threshold, and if so, performs step 115; or otherwise performs no operation.

At step 115, the braking controller determines that there is a risk of rear-end swing for the semitrailer and transmits to the braking system a braking release instruction instructing the braking system to release the braking pressure on each wheel of the trailer.

Figure 21:
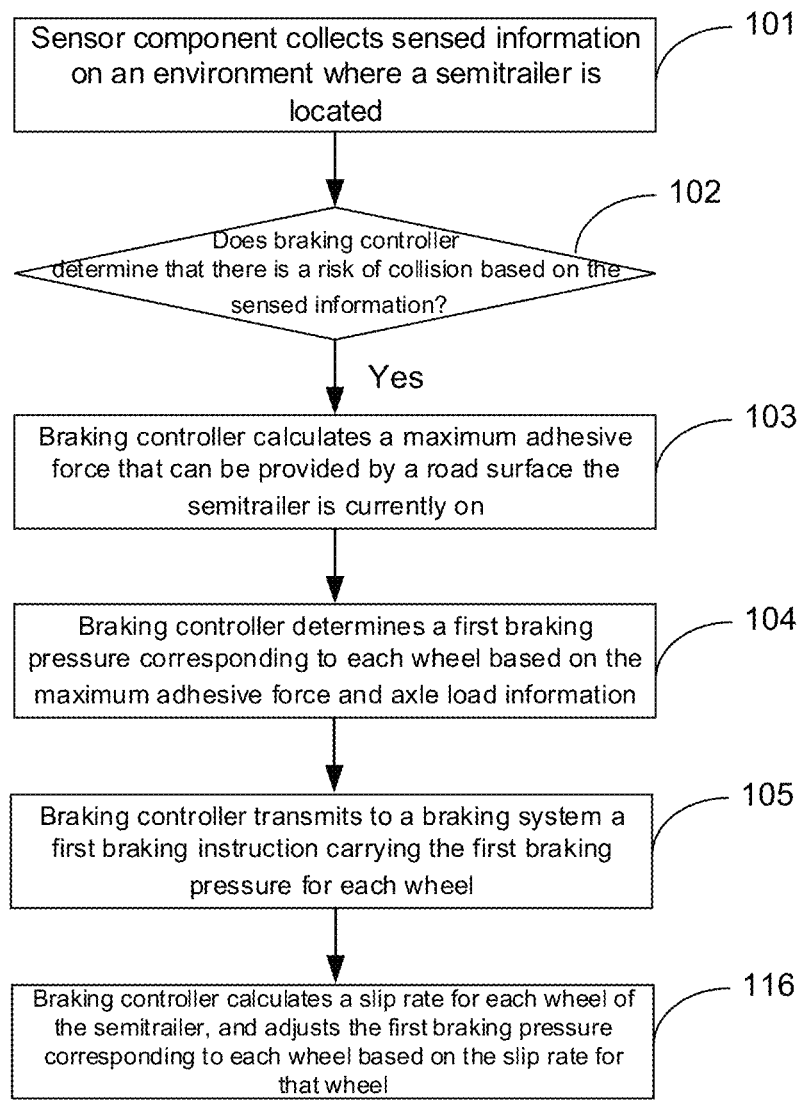
FIG. 21 is an eighth flowchart illustrating an emergency braking method according to an embodiment of the present disclosure.

In an embodiment of the present disclosure, the method shown in any of FIGS. 14~20 may further include step 116 after the step 105. For example, the method shown in FIG. 14 may further include step 116, as shown in FIG. 21.

At step 116, the braking controller calculates a slip rate for each wheel of the semitrailer, and adjusts the first braking pressure corresponding to each wheel based on the slip rate for that wheel.

Figure 22:
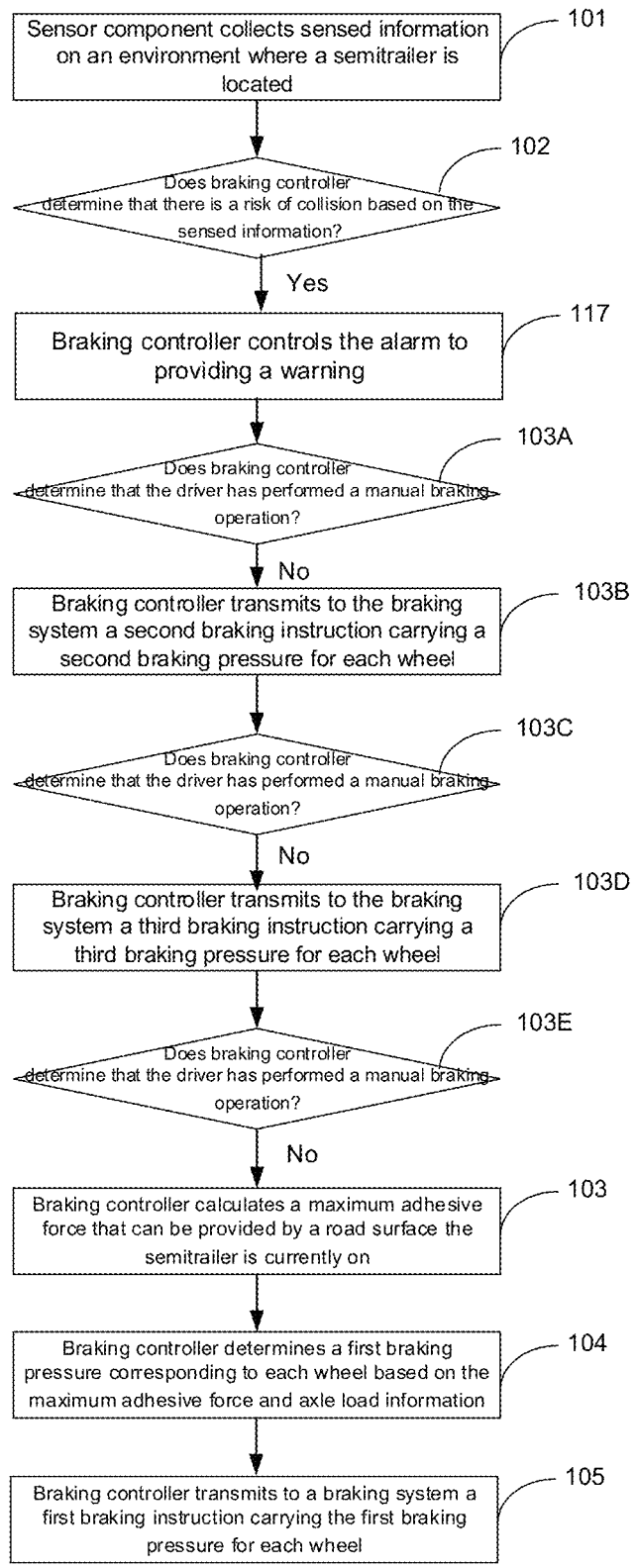
FIG. 22 is a ninth flowchart illustrating an emergency braking method according to an embodiment of the present disclosure.

In an embodiment of the present disclosure, the method shown in any of FIGS. 14~21 may further include step 117. For example, the method shown in FIG. 15 may further include step 117, as shown in FIG. 22.

The step 102 may further include: performing step 117.

At step 117, the braking controller controls an alarm to provide a warning.

For details regarding how to control the alarm to provide a warning, reference can be made to the relevant content in Embodiment 1 and the description thereof will be omitted here.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programming skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. An emergency braking system, comprising a sensor component and a braking controller communicatively connected with each other, wherein:
the sensor component is configured to collect sensed information on an environment where a semitrailer is located, the sensor component comprising an electronic stability system configured to collect sensed information comprising manual braking information indicating a braking operation on a braking pedal by a driver, and the semitrailer comprises a towing vehicle and a trailer, the trailer and the tow vehicle each comprising multiple wheels, and
the braking controller is configured to:
determine whether the driver has performed a manual braking operation based on the manual braking information, and if not, transmit to the braking system a first braking instruction carrying a first braking pressure for each wheel;
continue determining whether the driver has performed a manual braking operation based on the manual braking information, and if not, transmit to the braking system a second braking instruction carrying a second braking pressure for each wheel; and
continue determining whether the driver has performed a manual braking operation based on the manual braking information, and if not, calculate the maximum adhesive force that can be provided by the road surface the semitrailer is currently on;
determine whether there is a risk of collision for the semitrailer based on the sensed information, and if so, calculate a maximum adhesive force that can be provided by a road surface the semitrailer is currently on, determine a third braking pressure corresponding to each wheel based on the maximum adhesive force and axle load information, and transmit to a braking system a third braking instruction carrying the third braking pressure for each wheel,
wherein for each wheel, the first braking pressure is smaller than the second braking pressure, and the second braking pressure is smaller than the third braking pressure.

2. The system of claim 1, wherein the sensor component comprises a steering sensor configured to collect sensed information comprising a steering angle of a steering wheel, and
the braking controller is further configured to, prior to transmitting to the braking system the third braking instruction carrying the third braking pressure for each wheel:
determine whether the collision can be avoided by turning based on the steering angle;
if so, perform no operation, or
otherwise transmit to the braking system a fourth braking instruction carrying a fourth braking pressure for each wheel of a towing vehicle that is on an inner side of the turning, determine whether the collision can be avoided by the braking system braking each wheel of the towing vehicle that is on the inner side of the turning in accordance with the fourth braking instruction, and if not, transmit to the braking system the third braking instruction carrying the third braking pressure for each wheel.

3. The system of claim 1, wherein the braking controller is further configured to, prior to transmitting to the braking system the third braking instruction carrying the third braking pressure for each wheel:
determine whether the collision can be avoided by turning;
if so, transmit a turning instruction to a steering system, or
otherwise transmit to the braking system the third braking instruction carrying the third braking pressure for each wheel.

4. The system of claim 3, wherein the sensor component comprises an inertial measurement unit configured to collect sensed information comprising a roll angle and a roll velocity of a trailer, and
the braking controller is further configured to, while the semitrailer is turning:
determine whether there is a risk of rollover for the semitrailer based on the roll angle and roll velocity of the trailer, and if so, transmit to the braking system a fifth braking instruction carrying a fifth braking pressure for each wheel on an outer side of the turning.

5. The system of claim 3, wherein the braking controller is further configured to, while the semitrailer is turning:
calculate a maximum folding angle between a towing vehicle and a trailer;
determine whether the maximum folding angle is larger than a first predetermined angle threshold; and
if so, determine that there is a risk of folding between the towing vehicle and the trailer and transmit to the braking system a sixth braking instruction carrying a sixth braking pressure for each wheel of the towing vehicle that is on an outer side of the turning.

6. The system of claim 3, wherein the braking controller is further configured to, while the semitrailer is turning:
calculate a maximum rear-end swing angle of the semi-trailer;
determine whether the maximum rear-end swing angle is larger than a second predetermined angle threshold; and
if so, determine that there is a risk of rear-end swing for the semitrailer and transmit to the braking system a braking release instruction instructing the braking system to release the braking pressure on each wheel of the trailer.

7. The system of claim 1, wherein the braking controller is further configured to, while the braking system is braking each wheel in accordance with the third braking pressure for that wheel:
calculate a slip rate for each wheel of the semitrailer, and adjust the third braking pressure corresponding to each wheel based on the slip rate for that wheel.

8. The system of claim 1, further comprising an alarm communicatively connected to the braking controller,
wherein the braking controller is further configured to control the alarm to providing a warning when determining that there is a risk of collision.

9. A semitrailer, comprising the emergency braking system according to claim 1.

10. An emergency braking method, comprising:
collecting, by a sensor component, sensed information on an environment where a semitrailer is located, the sensed information comprising manual braking information indicating a braking operation on a braking pedal by a driver, and in which the semitrailer comprises a tow vehicle and a trailer;
determining, by a braking controller, whether there is a risk of collision for the semitrailer based on the sensed information; and
if so, calculating, by the braking controller, a maximum adhesive force that can be provided by a road surface the semitrailer is currently on, determining a first braking pressure corresponding to each wheel based on the maximum adhesive force and axle load information, and transmitting to a braking system a first braking instruction carrying the first braking pressure for each wheel;
wherein prior to calculating the maximum adhesive force that can be provided by the road surface the semitrailer is currently on, the method further comprises:
determining, by the braking controller, whether the driver has performed a manual braking operation based on the manual braking information, and if not, transmitting to the braking system a second braking instruction carrying a second braking pressure for each wheel;
continuing, by the braking controller, determining whether the driver has performed a manual braking operation based on the manual braking information, and if not, transmitting to the braking system a third braking instruction carrying a third braking pressure for each wheel; and
continuing, by the braking controller, determining whether the driver has performed a manual braking operation based on the manual braking information, and if not, calculating the maximum adhesive force that can be provided by the road surface the semitrailer is currently on,
wherein for each wheel, the second braking pressure is smaller than the third braking pressure, and the third braking pressure is smaller than the first braking pressure.

11. The method of claim 10, wherein the sensed information comprises a steering angle of a steering wheel, and the method further comprises, prior to transmitting to the braking system the first braking instruction carrying the first braking pressure for each wheel:
determining, by the braking controller, whether the collision can be avoided by turning based on the steering angle;
if so, performing no operation, or
otherwise transmitting, by the braking controller, to the braking system a fourth braking instruction carrying a fourth braking pressure for each wheel of a towing vehicle that is on an inner side of the turning, determining whether the collision can be avoided by the braking system braking each wheel of the towing vehicle that is on the inner side of the turning in accordance with the fourth braking instruction, and if not, transmitting to the braking system the first braking instruction carrying the first braking pressure for each wheel.

12. The method of claim 10, further comprising, prior to transmitting to the braking system the first braking instruction carrying the first braking pressure for each wheel:
determining, by the braking controller, whether the collision can be avoided by turning;
if so, transmitting a turning instruction to a steering system, or
otherwise transmitting, by the braking controller, to the braking system the first braking instruction carrying the first braking pressure for each wheel.

13. The method of claim 12, wherein the sensed information comprises a roll angle and a roll velocity of a trailer, and the method further comprises, while the semitrailer is turning:
determining, by the braking controller, whether there is a risk of rollover for the semitrailer based on the roll angle and roll velocity of the trailer, and if so, transmitting, by the braking controller, to the braking system a fifth braking instruction carrying a fifth braking pressure for each wheel on an outer side of the turning.

14. The method of claim 12, further comprising, while the semitrailer is turning:
calculating, by the braking controller, a maximum folding angle between a towing vehicle and a trailer;
determining, by the braking controller, whether the maximum folding angle is larger than a first predetermined angle threshold; and
if so, determining, by the braking controller, that there is a risk of folding between the towing vehicle and the trailer and transmitting to the braking system a sixth braking instruction carrying a sixth braking pressure for each wheel of the towing vehicle that is on an outer side of the turning.

15. The method of claim 12, further comprising, while the semitrailer is turning:
- calculating, by the braking controller, a maximum rear-end swing angle of the semitrailer;
- determining, by the braking controller, whether the maximum rear-end swing angle is larger than a second predetermined angle threshold; and
- if so, determining, by the braking controller, that there is a risk of rear-end swing for the semitrailer and transmitting to the braking system a braking release instruction instructing the braking system to release the braking pressure on each wheel of the trailer.

16. The method of claim 10, further comprising, while the braking system is braking each wheel in accordance with the first braking pressure for that wheel:
- calculating, by the braking controller, a slip rate for each wheel of the semitrailer, and adjusting the first braking pressure corresponding to each wheel based on the slip rate for that wheel.

17. The method of claim 10, further comprising: controlling, by the braking controller, an alarm to provide a warning when determining that there is a risk of collision.

* * * * *

UNITED STATES PATENT AND TRADEMARK OFFICE
CERTIFICATE OF CORRECTION

Page 1 of 2

PATENT NO. : 11,104,333 B2
APPLICATION NO. : 16/357726
DATED : August 31, 2021
INVENTOR(S) : Li et al.

It is certified that error appears in the above-identified patent and that said Letters Patent is hereby corrected as shown below:

In the Specification

In Column 4, Line 37, delete "exist" and insert -- exists --, therefor.

In Column 5, Line 9, delete "of" and insert -- to --, therefor.

In Column 5, Line 18, delete "of" and insert -- to --, therefor.

In Column 5, Line 19, delete "in" and insert -- in an --, therefor.

In Column 7, Line 55, delete "b1," and insert -- B1, --, therefor.

In Column 7, Line 62, delete "b2," and insert -- B2, --, therefor.

In Column 7, Line 64, delete "b3," and insert -- B3, --, therefor.

In Column 7, Line 65, delete "obtain" and insert -- obtaining --, therefor.

In Column 8, Line 1, delete "b4," and insert -- B4, --, therefor.

In Column 9, Line 13, delete "$\mu a k_{brake}+b$" and insert -- $\mu = a k_{brake}+b$ --, therefor.

In Column 10, Line 39, delete "B 1," and insert -- B1, --, therefor.

In Column 10, Line 40, delete "b1 and before the step b2." and insert -- B1 and before the step B2. --, therefor.

In Column 10, Line 62, delete "(In" and insert -- (in --, therefor.

In Column 11, Line 60, delete "here" and insert -- where --, therefor.

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,104,333 B2

In Column 12, Line 4, delete "steering controller 2" and insert -- braking controller 2 --, therefor.

In Column 12, Line 55, delete "φ" and insert -- ϕ --, therefor.

In Column 13, Line 2, delete "T." and insert -- $T_S$. --, therefor.

In Column 13, Line 52, delete "can" and insert -- can be --, therefor.

In Column 15, Line 48, delete "FIG. 16,17" and insert -- FIGs. 16, 17 --, therefor.

In the Claims

In Column 18, Line 8, in Claim 1, delete "wheel; and" and insert -- wheel; --, therefor.

In Column 18, Line 13, in Claim 1, delete "on;" and insert -- on; and --, therefor.

In Column 19, Line 36, in Claim 8, delete "providing" and insert -- provide --, therefor.